United States Patent
Aroyo et al.

(10) Patent No.: US 9,940,975 B2
(45) Date of Patent: Apr. 10, 2018

(54) SYSTEM AND METHOD FOR AUTOMATICALLY DISPLAYING VARIABLE IMAGE CONTENT IN AN IMAGE PRODUCT

(71) Applicant: Shutterfly, Inc., Redwood City, CA (US)

(72) Inventors: Nimrod Aroyo, Herzliya (IL); Shy Lev-Ari, Haifa (IL); Yaron Stein, Haifa (IL); Jonatan Mor, Haifa (IL)

(73) Assignee: Shutterfly, Inc., Redwood City, CA (US)

( * ) Notice: Subject to any disclaimer, the term of this patent is extended or adjusted under 35 U.S.C. 154(b) by 36 days.

(21) Appl. No.: 15/263,749

(22) Filed: Sep. 13, 2016

(65) Prior Publication Data

US 2018/0075883 A1  Mar. 15, 2018

(51) Int. Cl.
| | |
|---|---|
| *H04N 9/80* | (2006.01) |
| *G11B 27/28* | (2006.01) |
| *H04N 9/87* | (2006.01) |
| *G11B 27/32* | (2006.01) |
| *G06K 9/00* | (2006.01) |

(52) U.S. Cl.
CPC .......... *G11B 27/28* (2013.01); *G06K 9/00523* (2013.01); *G11B 27/32* (2013.01); *H04N 9/87* (2013.01)

(58) Field of Classification Search
USPC .................................................. 386/241, 248
See application file for complete search history.

(56) References Cited

U.S. PATENT DOCUMENTS

| | | | |
|---|---|---|---|
| 5,710,591 A * | 1/1998 | Bruno | H04M 3/42221 348/14.06 |
| 2015/0332084 A1* | 11/2015 | Klimov | A61B 5/1176 348/77 |
| 2016/0105305 A1* | 4/2016 | Pignataro | H04L 41/0893 709/223 |

* cited by examiner

*Primary Examiner* — Nigar Chowdhury
(74) *Attorney, Agent, or Firm* — Xin Wen

(57) ABSTRACT

A computer-implemented method for automatically displaying variable image content in an image product includes automatically obtaining markers in photos or videos in a user account which includes detecting features in image content of the photos or the video frames and obtaining a marker for one of the photos or the video frames, automatically identifying a sequence of similar photos or videos if the markers detected in the photos or the associated video frames include more than a predetermined number or percentage of common features, detecting a marker in a photo product by a user device when the photo product is viewed by the user device, identifying a marked photo incorporated in the photo product based on the marker detected in the photo product, and enabling photos or videos in a sequence photos or videos associated with the marked photo to be displayed on the user device.

14 Claims, 10 Drawing Sheets

SYSTEM AND METHOD FOR AUTOMATICALLY DISPLAYING VARIABLE IMAGE CONTENT IN AN IMAGE PRODUCT

TECHNICAL FIELD

This application relates to image-based products, and more specifically, to technologies for viewing image-based products using variable personal content.

BACKGROUND OF THE INVENTION

In digital imaging technologies, images are captured by mobile phones or digital cameras. Digital images can be incorporated into image products such as photo books, photo calendars, photo greeting cards, posters, photo decor, photo mugs, photo T-shirts, photo coasters, photo coasters, photo aprons, and so on.

While there are widespread usage of digital images on devices and ubiquitous presence of physical image products, there is a lack of interactions between physical image products and digital images once the physical products have been created.

There is still a need to enrich and broaden users' imaging experiences associated with both digital images and physical image products.

SUMMARY OF THE INVENTION

The present application discloses system and method that significantly enhance users' experiences with photos and photo products by intelligently connect digital images with images used in photo products. Using the disclosed system and method, photo products are no longer static objects; they can bring life to the photos on photo products by presenting associated photos and videos within the photo products.

In another aspect, the disclosed system and method help users better keep memories of past events by recreate multiple photos and videos about each past event in response to a single static photo about the past event.

In one general aspect, the present invention relates to a computer-implemented method for automatically displaying variable image content in an image product, comprising: automatically obtaining markers in photos or videos in a user account comprising: detecting features in image content of the photos or the video frames in the videos; and obtaining a marker for one of the photos or the video frames by combining a plurality of features detected in the one of the photos or the video frames; automatically identifying a sequence of similar photos or videos by a content server if the markers detected in the photos or the associated video frames include more than a predetermined number or a predetermined percentage of common features; detecting a marker in a photo product by a user device when the photo product is viewed by the user device; identifying a marked photo incorporated in the photo product based on the marker detected in the photo product; and enabling photos or videos in a sequence photos or videos associated with the marked photo to be displayed on the user device.

Implementations of the system may include one or more of the following. The marked photo can be associated with the user account, and the computer-implemented method can further include retrieving the photos or the videos associated with the marked photo using the marker detected in the photo product. The photos or videos associated with the marked photo can be displayed in place of the marked photo on the photo product on the user device. The photos or videos associated with the marked photo can be displayed on the side or over the marked photo on the photo product on the user device. The photo product can be recorded in video by the user device, wherein the marker in the photo product can be detected in video frames in the video recording. The photo product can be captured by the user device in a still image, wherein the marker in the photo product is detected in the still image. The computer-implemented method can further include ranking the photos or videos in the sequence to produce a ranked order, wherein the photos or videos associated with the marked photo are displayed on the user device in accordance with the ranked order. The photos or videos in the sequence are ranked based on image content, image quality, and the markers associated with the photos or videos. The step of automatically identifying a sequence of similar photos or videos can further include: comparing features in two photos or the video frames; identifying common features in the two photos or the video frames; and determining if the common features are more than a predetermined number or a predetermined percentage of a total number of feature in the two photos or the video frames. The sequence of similar photos or videos can be identified among the photos or videos that are captured or recorded within a time window. A sequence of similar photos or videos can be identified among the photos or videos that are captured or recorded within a geographic area. The computer-implemented method can further include displaying a photo product incorporating the marked photo in an online product store; and manufacture the photo product incorporating the marked photo in response to a user order. The computer-implemented method can further include storing the photos and videos in association with their respective markers in a content storage in connection with the content server. The computer-implemented method can further include downloading the photos or videos associated with the marked photo to the user device.

These and other aspects, their implementations and other features are described in detail in the drawings, the description and the claims.

DETAILED DESCRIPTION OF THE INVENTION

Figure 1:
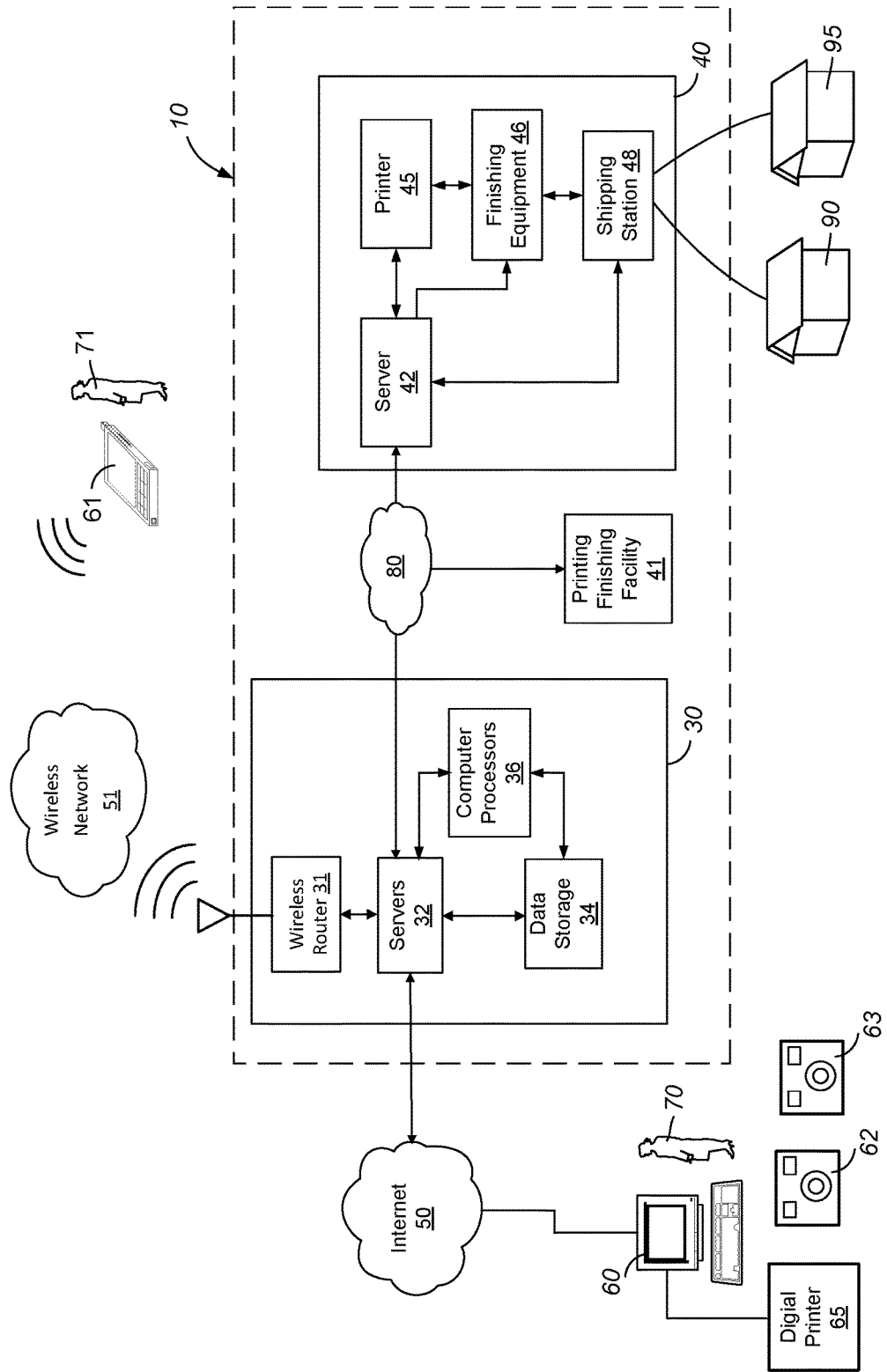
FIG. 1 is a block diagram of a network-based system for producing personalized image products, image designs, or image projects compatible with the present invention.

Referring to FIG. 1, a network-based imaging service system 10 enables users 70, 71 to organize and share images via a wired network or a wireless network 51. The network-based imaging service system 10, operated by an image service provider such as Shutterfly, Inc., can fulfill image products ordered by users 70, 71. The network-based imaging service system 10 includes a data center 30, one or more product fulfillment centers 40, 41, and a computer network 80 that facilitates communications between the data center 30 and the product fulfillment centers 40, 41.

The data center 30 includes one or more servers 32 for communicating with devices (60, 61) owned by users 70, 71, a data storage 34 for storing user data, image and design data, and product information, and computer processor(s) 36 for rendering images and product designs, organizing images, and processing orders. The user data includes account information, discount information, and order information associated with the user. A website can be powered by the servers 32 and can be accessed by the user 70 using a computer device 60 via the Internet 50, or by the user 71 using a wireless device 61 via the wireless network 51. The servers 32 can also support a mobile application to be downloaded onto wireless devices 61.

The network-based imaging service system 10 provides tool for users to design and personalize photo products. In the present disclosure, the term "personalized" (or "individualized" or "customized") refers to content that is specific to the recipient, the user, the gift product, and the occasion, which can include personalized text, personalized images, and personalized designs. Examples of personalized image products may include photobooks, personalized greeting cards, photo stationeries, photo or image prints, photo posters, photo banners, photo playing cards, photo T-shirts, photo mugs, photo aprons, photo magnets, photo mouse pads, a photo phone case, a case for a tablet computer, photo key-chains, photo collectors, photo coasters, photo banners, or other types of photo gift or novelty item. The term photobook generally refers to as bound multi-page product that includes at least one image on a book page. Photobooks can include image albums, scrapbooks, bound photo calendars, or photo snap books, etc. An image product can include a single page or multiple pages. Each page can include one or more images, text, and design elements. Some of the images may be laid out in an image collage.

The user 70 or his/her family often owns multiple cameras 62, 63 including mobile phones with built-in cameras, digital cameras, a video camera, and computers with built-in cameras. The user 70 transfers images from cameras 62, 63 to the computer device 60 (e.g. a personal computer, a laptop, or tablet computer, a mobile phone, etc.) on which the images can be edited and organized.

Images in the cameras 62, 63 are stored on the computer device 60 and the wireless device 61 can be uploaded to the server 32 to allow the user 70 to organize and render images at the web site, share the images with others, and design or order image product incorporating the images. The pictures on the wireless device 61 can be uploaded to the data center 30. If users 70, 71 are members of a family or a group (e.g. a soccer team), the images from the cameras 62, 63 and the mobile device 61 can be grouped together to be incorporated into an image product such as a photobook, or used in a blog page for an event such as a soccer game.

The users 70, 71 can order a physical product based on the design of the image product, which can be manufactured by the printing and finishing facilities 40 and 41. A recipient receives the physical product with messages from the users at locations 90, 95. The recipient can also receive a digital version of the design of the image product over the Internet 50 and/or a wireless network 51. For example, the recipient can receive, on her mobile phone, an electronic version of the greeting card signed by handwritten signatures from her family members.

The images or videos stored in the data storage 34, the computer device 60, or the mobile device 61 usually include groups of photos or videos taken at different events and occasions.

Figure 2:
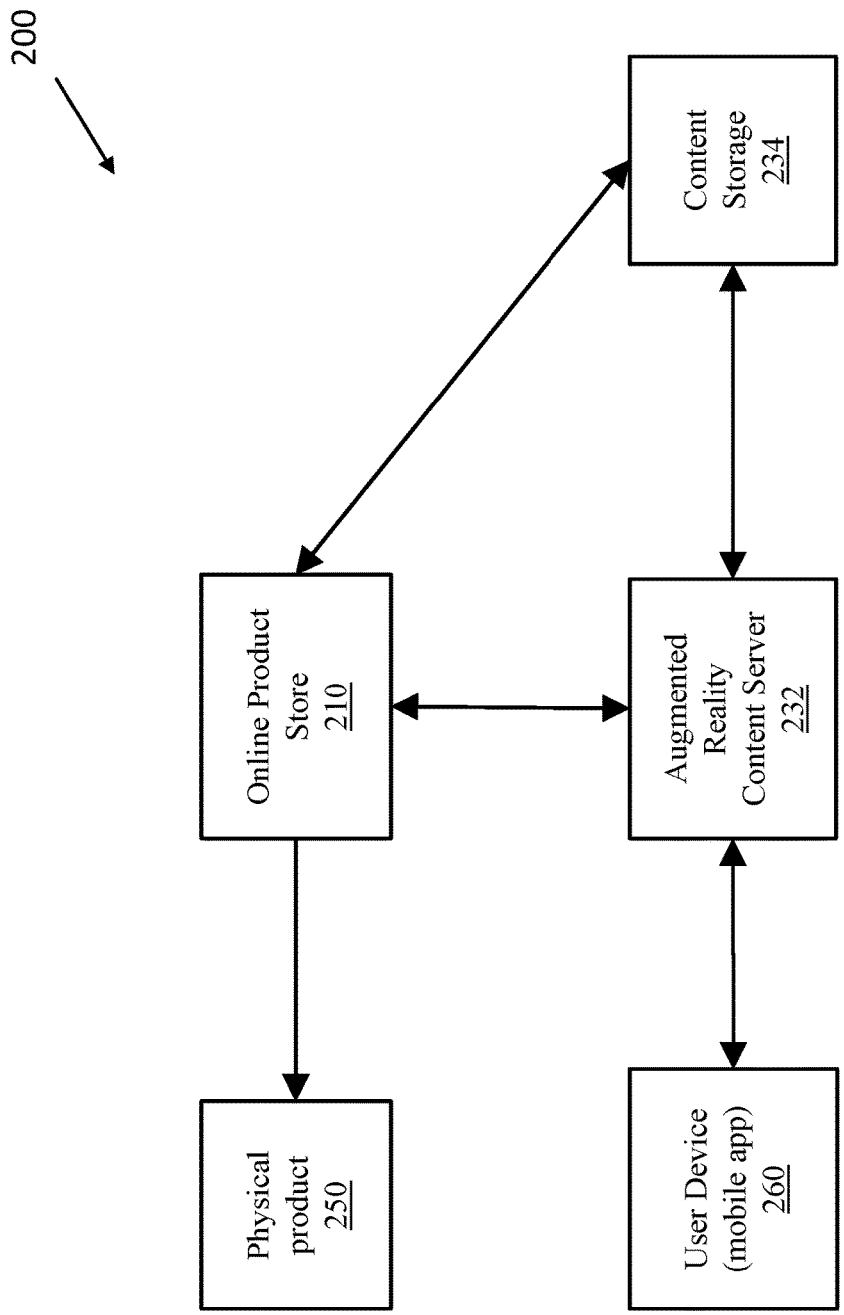
FIG. 2 is a block diagram of a portion of the network-based system in FIG. 1 for providing generating, storing, and supplying photos or videos associated with an occasion or event to user devices in response to the image capture of a related photo product in accordance with the present invention.

To better preserve people's memories and tell stories about these occasions and events, photos and videos taken at the events and occasions are organized in sequences or groups, and are supplied to and presented at user devices when a photo associated with an event or an occasion is detected. Referring to FIGS. 1 and 2, a network-based sub-system 200 includes an online product store 210, an augmented-reality content server 232, and a content storage 234. The content storage 234 can be part of the data storage 34 that stores photos or videos uploaded from user devices (70, 71). The online product store 210 is stored in data stored 34 (in FIG. 1), are holds design layouts and design elements for many types of personlizable photo products, which can be presented on user devices (70, 71) by servers 32. The personlizable photo products include areas for incorporating photos, text, and design elements provided or selected by users from the content storage 234 or the user device 260. The augmented-reality content server 232, which can be one of the servers 32, can analyze photos and video stored in the content storage 234, and can send and receive data to and from user device 260 (e.g. 60, 61) and the online product store 210. Photo products designed by user in the online product store 210 can be sent to the printing and finishing facilities 40 and 41 in which physical copies of the photo products are manufactured and then sent to users.

Figure 3:
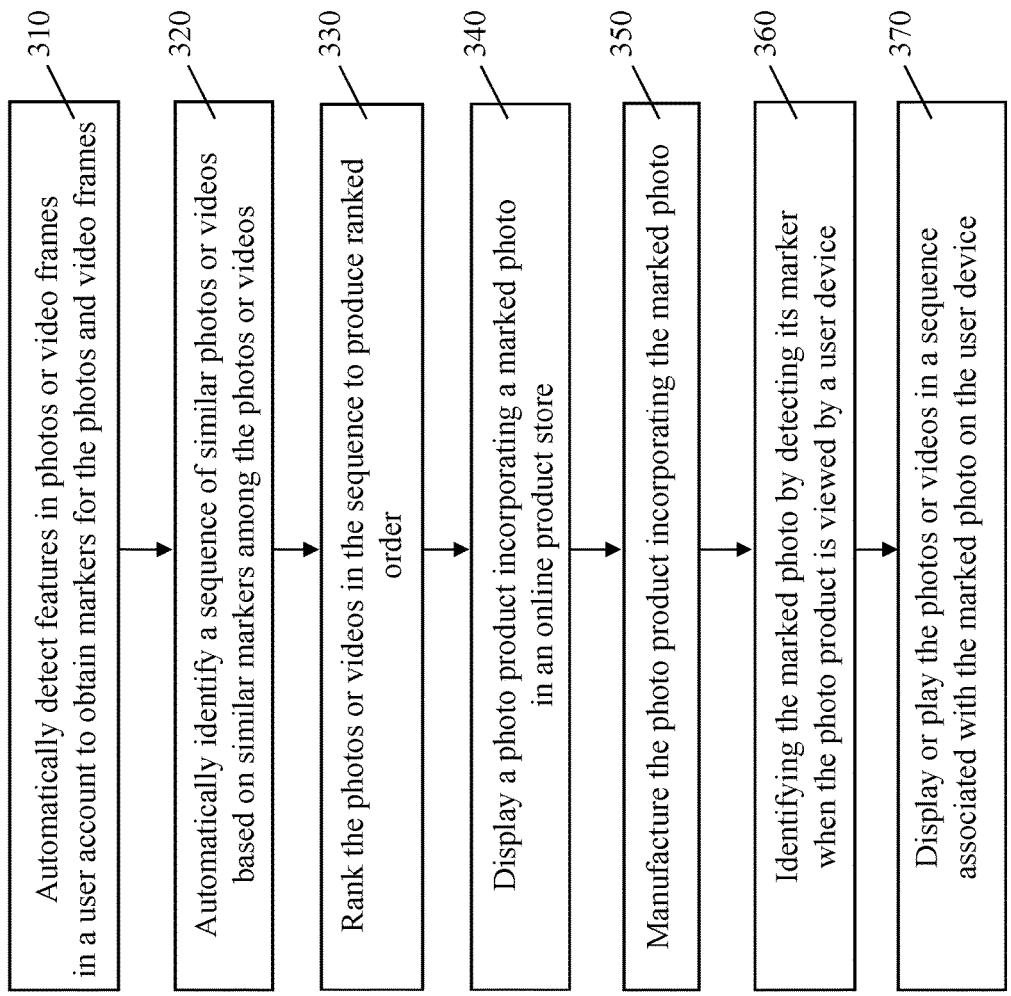
FIG. 3 is a flow diagram for providing generating, storing, and supplying photos or videos associated with an occasion or event to user devices in response to the image capture of a related photo product in accordance with the present invention.
Figure 4:
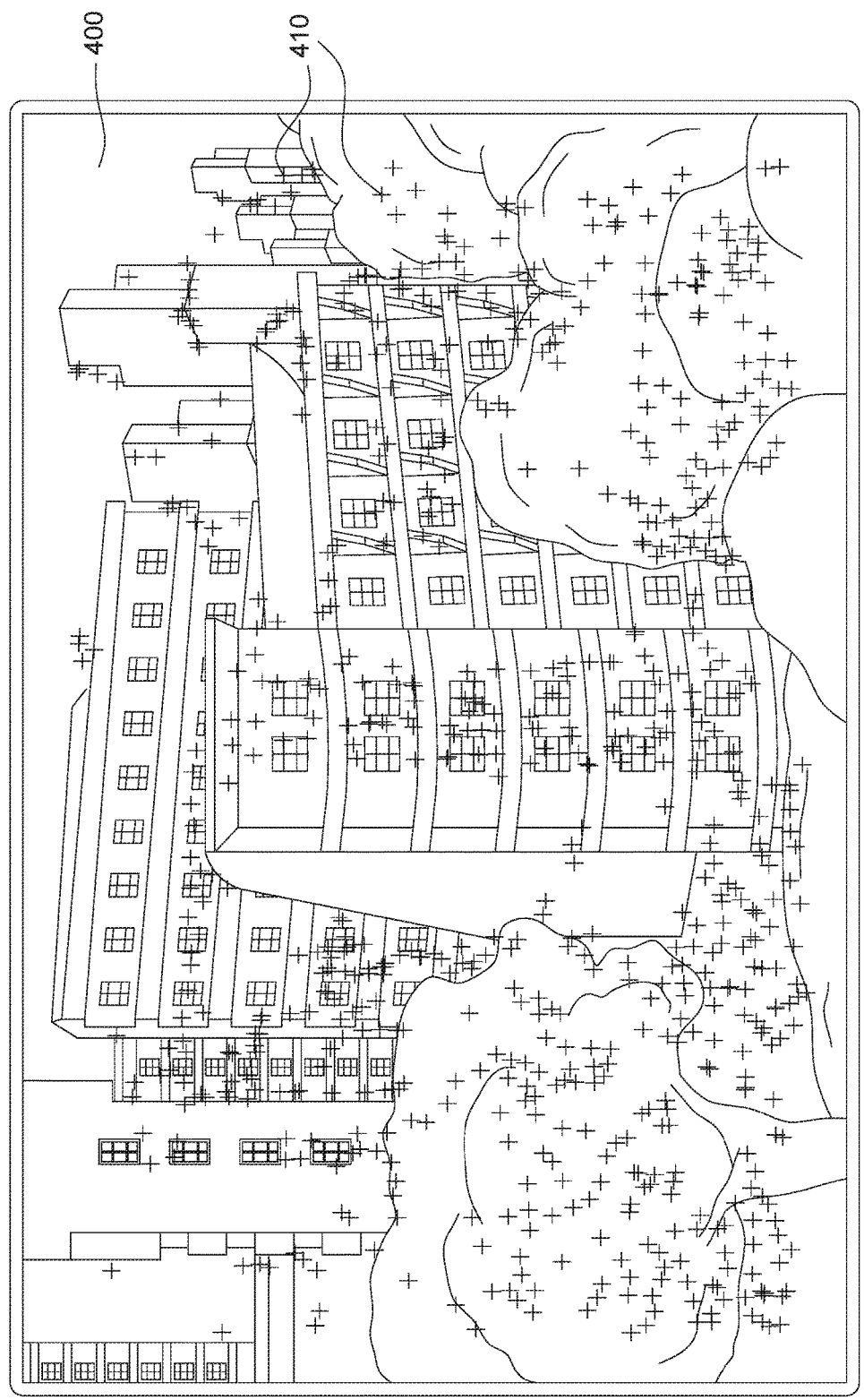
FIG. 4 illustrates identification of features in a photo that in combination can be used as the photo's marker.

Referring to FIGS. 2 and 3, features are automatically detected in photos or video frames in a user account (step 310). The augmented-reality content server 232 automatically crawls the content storage 234 to detect features in the photos and videos stored therein. In contrast to or in addition to the conventional QR codes, barcodes, or symbols printed separately from photos, features include objects that are part of the image content: people (family and friends of the user), children, human faces, specific geometric shapes of local areas or objects in a photo, landmarks, logos, text, etc., which can be recognized in image object analysis. For example, hundreds of such features 410 can be extracted using image object analysis and computer vision from a photo 400 shown in FIG. 4. The features 410 detected photo 400 in combination serve as a marker that identifies the photo 400 (step 310). These markers (each comprising a collection of features found in a photo) are stored in association with their respective photos in the content storage 234. The photos having assigned markers are referred to as marked photos.

The markers can be used to identify photos and video frames. If two photos or video frames in a user account are associated with markers that share enough similarity, the two photos and related video clips are automatically identified and assigned to a same sequence (step 320). The photos and videos are most likely taken at a same occasion or event.

When two markers from different photos or video frames are compared, the features in the respective markers are compared. The comparison between two individual features can involve scaling, rotation, and affine transformation of one or two of the two features for checking if the two shapes match with each other. In addition to the shape matching, the color and color combinations, densities, and contrast can also be sued to match two features. If the two markers contain common features more than a threshold number or a threshold percentage, the two markers are considered to be similar.

In some embodiments, photos and video frames that share similar markers are identified only for those photos or videos captured or recorded within certain time window or within a geographic area, which further increases the certainty of the photos and videos being taken at a same occasion or event. These photos or videos are assigned to a same sequence that corresponds to an event or occasion. The marked photos and their associated sequences are stored in the content storage 234.

In the content storage 234 or on a user device 260, the marked photos or videos of marked video frames in a sequence are stored in association with each other. For example, the marked photos or videos of marked video frames in a sequence can all be tagged with a common tag that uniquely identifies the sequence. Each of the marked photos or marked video frames in the sequence is stored in association with the features in their respective images. When one marked photo or marked video frame is detected, the common tag for the sequence can be retrieved and all image content related to the sequence can be retrieved from the content storage 234 or on a user device 260.

Figure 5A:
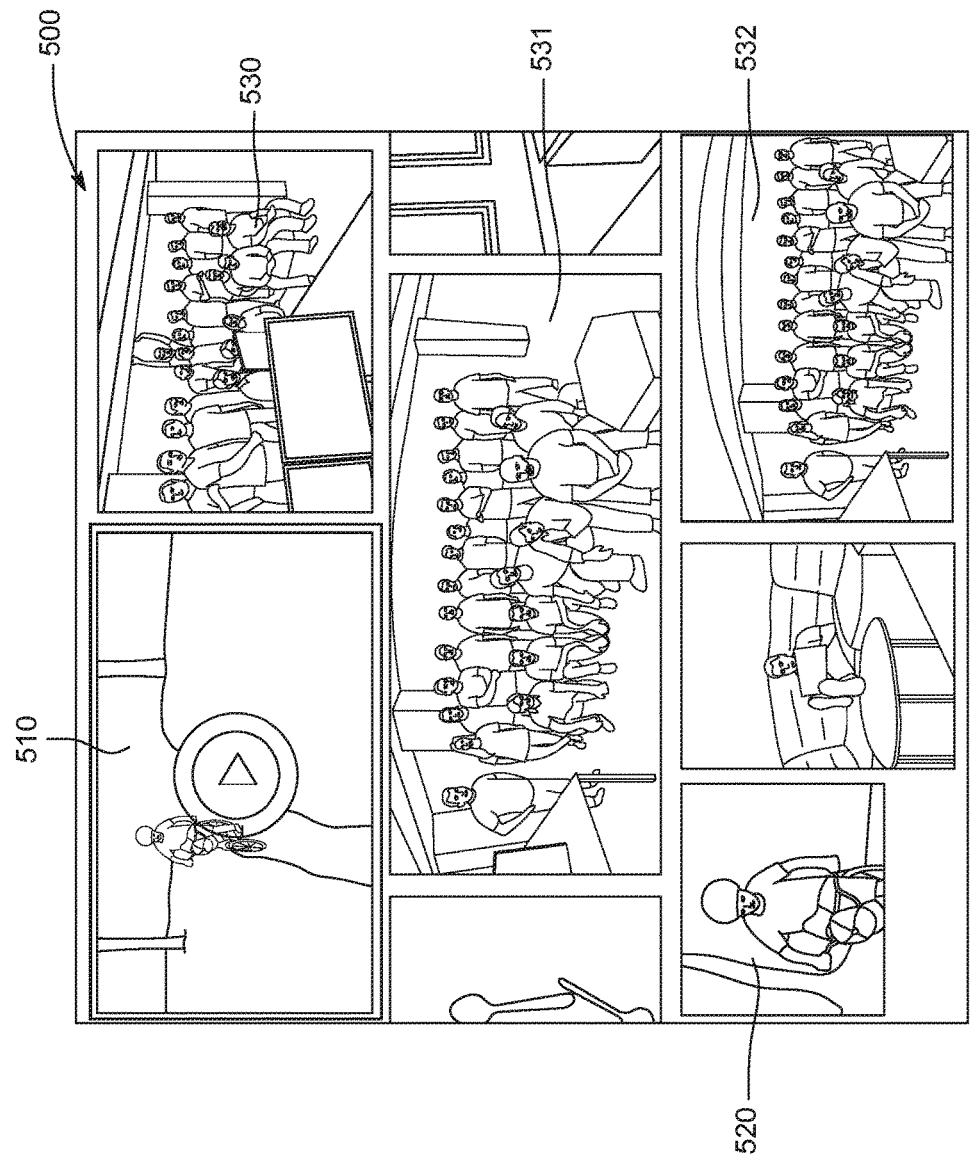
FIG. 5A illustrates photos and videos in a user account.
Figure 5B:
FIG. 5B illustrates a sequence of photos identified as being associated with an occasion or event.

Referring to FIG. 5A, a video 510 and a photo 520 have similar markers and are assigned to one sequence. Photos 530, 531, 532 are found to share similar markers such that they are grouped in another sequence. In FIG. 5B, photos 571-576 are identified to have more than a predetermined number or a predetermined percentage (of a total number of features) of common features that make their associated markers similar (also within certain time window and within certain geographic area), which are assigned to a same sequence.

Figure 6:
FIG. 6 illustrates ranking photos in a sequence of photos associated with an occasion or event.

Next, the photos or videos within a sequence are ranked to produce a ranked order (step 330). Referring to FIG. 6, the photos 571-576 are ranked in a sequence 1 through 6 with lower order number representing more representative photos or video for that event or occasion. The photos or video frames within a sequence of photos can be automatically ranked by the augmented-reality content server 232 based on image content, image quality, and marker quality. The factors related to image content include the presence (or absence) of people, smiling faces, children, and image composition, etc. The presence of a smiling face makes a photo or video frame higher ranking than ones containing neutral faces. Similarly, the presence of children or family member or friend people gives a photo higher ranking. Furthermore, photos or video frames having higher image quality are more compatible with photo products and can be ranked higher. Parameters related to image properties can include color saturation, exposure, shadow or highlight details, sharpness, contrast. Moreover, the markers in the marked photos and video frames are validated. Strengths of the markers are evaluated. Only photos and video frames having markers having number of common features that pass a certain threshold are used as marked photos that can be made into photo products. Photos and video frames that have image content, image quality, or markers below predetermined thresholds are discarded from the sequence.

Figure 7A:
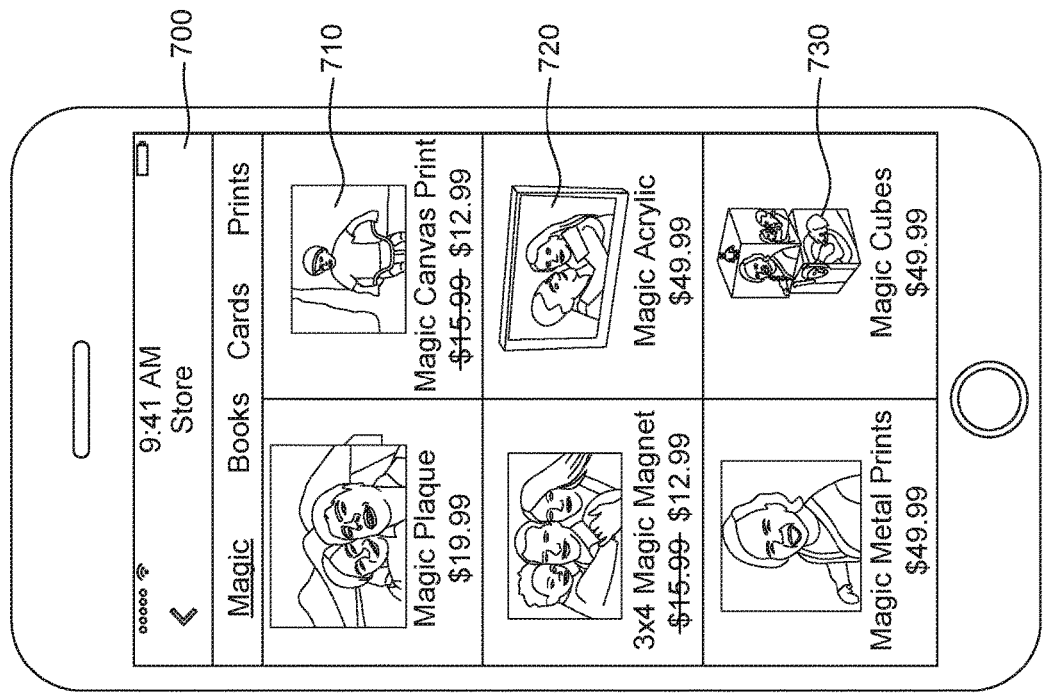
FIG. 7A illustrates a user interface for a user to select a type of a photo product.
Figure 7B:
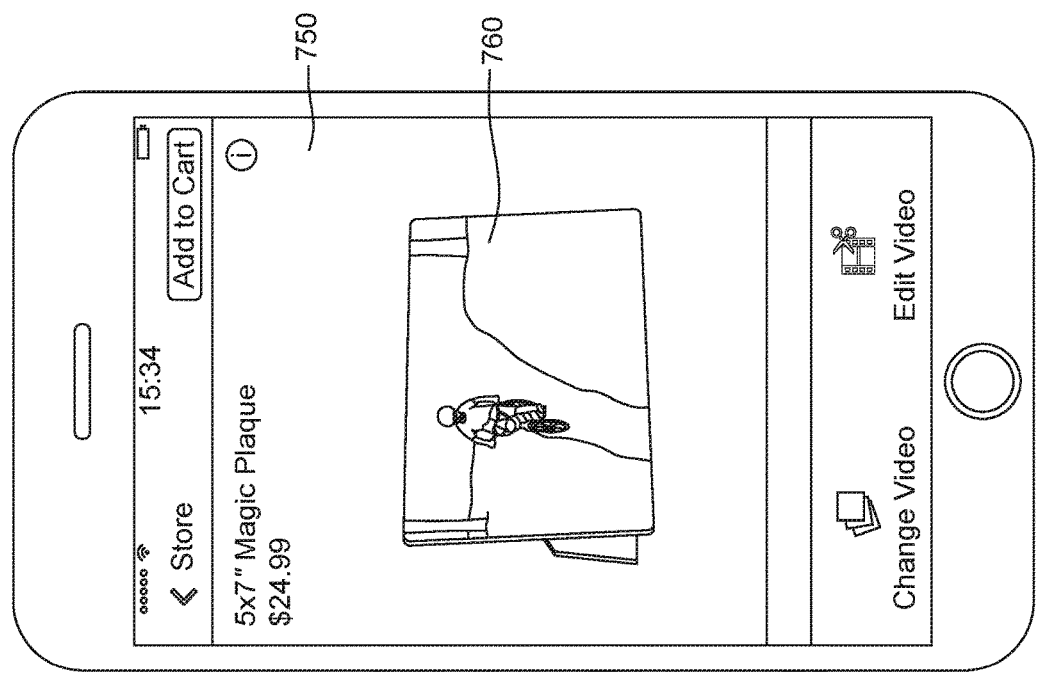
FIG. 7B illustrates a user interface for a user to create and order a photo product incorporating a marked photo.

Next, photo products are displayed in an online product store. The photo products incorporate marked photos (step 340) provided by the content storage 234. As shown in FIG. 7A, a user interface 700 shows different types of personalized photo products such as photo plaque, canvas photo print, photo magnet, acrylic photo print, metal photo prints, photo cubes, etc. A photo product can incorporate a marked photo from the user account. In FIG. 7B, a user interface to an online product store (210, FIG. 2) includes a photo plaque 760 with a static "boy biking" photo is displayed in a perspective view. The static "boy biking" photo and other photos incorporated in photo products include markers that can be recognized by the augmented-reality content server (232, FIG. 2) or applications downloaded onto user devices from the augmented-reality content server (232, FIG. 2). The marked photo in the photo product can be selected by a user or automatically suggested by the online product store (210, FIG. 2) or the augmented reality content server (232, FIG. 2).

The user can select or create design styles and layout for a photo product in the online store. The user can select different marked photos (from the content storage 234) for the photo product. The photo product is ordered by the user from the online product store (210, FIG. 2). The finished design is sent to a finishing facility, in which the photo product is manufactured for a user (step 350).

Figure 8:
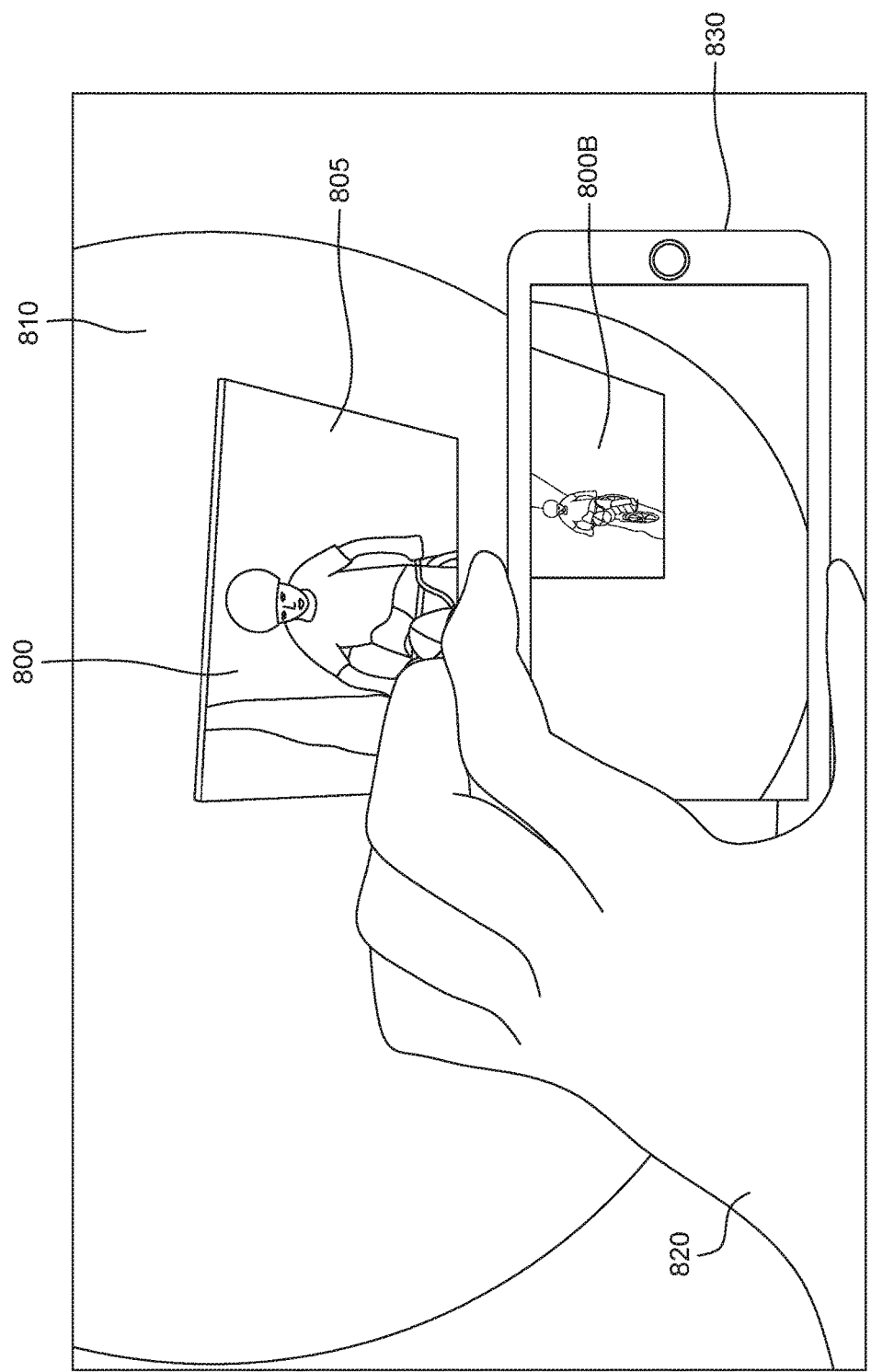
FIG. 8 illustrates playing of the photos or videos associated with the marked photo in place of the marked photo within the photo product on a user device.

The user can display the physical photo product at home or at work, or share the photo product with family members or friends. For example, referring to FIG. 8, the photo plaque 800 having the marked photo 805 is displayed on a coffee table 810 in a home environment. The user 820 uses a mobile device 830 installed with a mobile application downloaded from the augmented-reality content server or other servers (232, FIG. 2) in the network-based imaging service system (10, FIG. 2) to record a video of the home environment. A library of markers and associated photos and videos are stored in the content storage 234, and can be pre-downloaded to the user device 260.

Using the mobile application, the photo plaque 800B is captured in video frames or a series of still images (see below) by the mobile device 830. The marked photo (e.g. boy riding a bike) is automatically recognized by detecting the marker in the marked photo within video frames (step 360). The sequence of photos or videos associated with the marked photo is retrieved from the content storage 234 and downloaded to the user device 260. Alternatively, the photos or videos associated with the marked photo can be previously downloaded to the user device 260.

A button may appear next to the marked photo with the mobile application to indicate that other photos and video are available from the user account about the same occasion or event. After the button is touched, photos or videos in the sequence associated with the marked photo (e.g. boy riding a bike) are played on the user device (e.g. mobile device 830) (step 370). The selection of the associated photos or videos for playing can be based on the ranked order. The video or photos can be played in place of the marked photo within the photo product. For example, a video of boy riding a bicycle during the same occasion can be played perceptively in the area of the marked photo 805 on the photo plaque 840. Alternatively, a video of boy riding a bicycle during the same occasion can be played on the side of the photo plaque 800B in the user interface of the mobile device 830.

In some embodiments, an image of the photo plaque 800 is captured by the mobile device 830 in a still photo capture mode. Features that belong to a marker are detected in the marked photo (e.g. boy riding a bike) and the marked photo recognized. The marker detection can be conducted by the mobile application on the mobile device, or being by the augmented-reality content server (232, FIG. 2). The sequence of photos or videos associated with the marked photo is retrieved from the content storage 234 and downloaded to the user device 260. Alternatively, the photos or videos associated with the marked photo can be previously downloaded to the user device 260. The mobile application can play or display the videos or the photos (in a slide show) associated with the marked photo on the user device (e.g. mobile device 830) (step 370). The video or the photos can be played or displayed in place of the marked photo within the photo product (e.g. on the photo plaque in a perspective view in FIG. 8). The photos can for example be played in a slide show. In some embodiments, the video or photos can be played or displayed on the side or over of the photo product. The selections of the videos or the photos associated with the marked photo can be in accordance with the ranked order within the sequence of videos or photos associated with the marked photo.

It should be understood that the presently disclosed systems and methods can be compatible with different devices or applications other than the examples described above. For example, the disclosed method is suitable for desktop, tablet computers, mobile phones and other types of network connectable computer devices. The photo products compatible with the present invention are not limited to the examples described above.

What is claimed is:

1. A computer-implemented method for automatically displaying variable image content in an image product, comprising:
    automatically obtaining markers in photos or videos in a user account comprising:
        detecting features in image content of the photos or the video frames in the videos; and
        obtaining a marker for one of the photos or the video frames by combining a plurality of features detected in the one of the photos or the video frames;
    automatically identifying a sequence of similar photos or videos by a content server if the markers detected in the photos or the associated video frames include more than a predetermined number or a predetermined percentage of common features;
    detecting a marker in a photo product by a user device when the photo product is viewed by the user device;
    identifying a marked photo incorporated in the photo product based on the marker detected in the photo product; and
    enabling photos or videos in a sequence photos or videos associated with the marked photo to be displayed on the user device.

2. The computer-implemented method of claim 1, wherein the marked photo is associated with the user account, the computer-implemented method further comprising:
    retrieving the photos or the videos associated with the marked photo using the marker detected in the photo product.

3. The computer-implemented method of claim 1, wherein the photos or videos associated with the marked photo are displayed in place of the marked photo on the photo product on the user device.

4. The computer-implemented method of claim 1, wherein the photos or videos associated with the marked photo are displayed on the side or over the marked photo on the photo product on the user device.

5. The computer-implemented method of claim 1, wherein the photo product is recorded in video by the user device, wherein the marker in the photo product is detected in video frames in the video recording.

6. The computer-implemented method of claim 1, wherein the photo product is captured by the user device in a still image, wherein the marker in the photo product is detected in the still image.

7. The computer-implemented method of claim 1, further comprising:
    ranking the photos or videos in the sequence to produce a ranked order, wherein the photos or videos associated with the marked photo are displayed on the user device in accordance with the ranked order.

8. The computer-implemented method of claim 7, wherein the photos or videos in the sequence are ranked based on image content, image quality, and the markers associated with the photos or videos.

9. The computer-implemented method of claim 1, wherein the step of automatically identifying a sequence of similar photos or videos further comprises:
    comparing features in two photos or the video frames;
    identifying common features in the two photos or the video frames; and
    determining if the common features are more than a predetermined number or a predetermined percentage of a total number of feature in the two photos or the video frames.

10. The computer-implemented method of claim 1, wherein the sequence of similar photos or videos are identified among the photos or videos that are captured or recorded within a time window.

11. The computer-implemented method of claim 1, wherein a sequence of similar photos or videos is identified among the photos or videos that are captured or recorded within a geographic area.

12. The computer-implemented method of claim 1, further comprising:
    displaying a photo product incorporating the marked photo in an online product store; and
    manufacture the photo product incorporating the marked photo in response to a user order.

13. The computer-implemented method of claim 1, further comprising:
    storing the photos and videos in association with their respective markers in a content storage in connection with the content server.

14. The computer-implemented method of claim 1, further comprising:
    downloading the photos or videos associated with the marked photo to the user device.

* * * * *